(12) United States Patent
Jonai et al.

(10) Patent No.: US 8,105,679 B2
(45) Date of Patent: Jan. 31, 2012

(54) ACTINIC RADIATION CURABLE JET-PRINTING INK

(75) Inventors: Kazuhiro Jonai, Tokyo (JP); Yasuo Yoshihiro, Tokyo (JP); Daisuke Nishida, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 662 days.

(21) Appl. No.: 11/995,004

(22) PCT Filed: Jul. 21, 2006

(86) PCT No.: PCT/JP2006/314490
§ 371 (c)(1),
(2), (4) Date: Jan. 8, 2008

(87) PCT Pub. No.: WO2007/013368
PCT Pub. Date: Feb. 1, 2007

(65) Prior Publication Data
US 2009/0171007 A1    Jul. 2, 2009

(30) Foreign Application Priority Data

| Jul. 25, 2005 | (JP) | 2005-214433 |
| Nov. 11, 2005 | (JP) | 2005-327135 |
| Apr. 21, 2006 | (JP) | 2006-117696 |
| Apr. 28, 2006 | (JP) | 2006-125751 |

(51) Int. Cl.
*C08F 36/20* (2006.01)
*B41M 7/00* (2006.01)

(52) U.S. Cl. ........ 428/195.1; 526/320; 522/178

(58) Field of Classification Search .......... 522/178; 428/195.1; 526/320
See application file for complete search history.

(56) References Cited

U.S. PATENT DOCUMENTS

| 6,913,352 B2 * | 7/2005 | Yoshihiro et al. | 347/100 |
| 7,026,368 B2 * | 4/2006 | Yamada et al. | 522/83 |
| 7,135,504 B2 * | 11/2006 | Yamada et al. | 522/71 |
| 2004/0019128 A1 | 1/2004 | Kondo | |
| 2004/0099170 A1 * | 5/2004 | Takabayashi | 101/491 |
| 2005/0250869 A1 * | 11/2005 | Claes et al. | 522/71 |

FOREIGN PATENT DOCUMENTS

| EP | 1 331 251 A1 | 7/2003 |
| JP | 5 214280 | 8/1993 |
| JP | 5 255464 | 10/1993 |
| JP | 6 184484 | 7/1994 |
| JP | 10 36625 | 2/1998 |
| JP | 11 80273 | 3/1999 |
| JP | 2002 241647 | 8/2002 |
| JP | 2003-145573 | 5/2003 |
| JP | 2003-292837 | 10/2003 |
| JP | 2004-59627 | 2/2004 |
| JP | 2004-99796 | 4/2004 |
| JP | 2004 514014 | 5/2004 |
| JP | 2004 518787 | 6/2004 |
| JP | 2005-126509 | 5/2005 |
| WO | WO 2005/026270 A1 | 3/2005 |

OTHER PUBLICATIONS

U.S. Appl. No. 12/093,242, filed May 9, 2008, Nishida, et al.
U.S. Appl. No. 12/279,775, filed Aug. 18, 2008, Yoshihiro, et al.
Notice of Reasons for Rejection issued in Japanese Publication No. 2007-528436 issued Mar. 8, 2011 (w/English Translation).
Decision of Rejection issued Jun. 7, 2011, in corresponding Japanese Publication No. 2007-528436, issued Oct. 11, 2007 (w/English translation).

* cited by examiner

*Primary Examiner* — David W Wu
*Assistant Examiner* — Vu A Nguyen
(74) *Attorney, Agent, or Firm* — Oblon, Spivak, McClelland, Maier & Neustadt, L.L.P.

(57) ABSTRACT

The present invention relates to an active energy beam-curable ink comprising polymerizable monomers, wherein relative to the total of all the polymerizable monomers, the polymerizable monomers comprise from 95 to 99.99% by weight of a monofunctional monomer and from 0.01 to 5% by weight of a polyfunctional monomer, and a cured film of thickness 10 μm formed using the active energy beam-curable ink exhibits a drawing ability exceeding 120% when stretched at a temperature of 170° C. at a strain rate of 2/min.

16 Claims, No Drawings

ACTINIC RADIATION CURABLE JET-PRINTING INK

TECHNICAL FIELD

The present invention relates to an active energy beam-curable ink for inkjet printing. Furthermore, the present invention also relates to a cured film formed using the active energy beam-curable ink. Moreover, the present invention also relates to a printed item comprising the cured film.

BACKGROUND ART

Conventionally, active energy beam-curable inks for inkjet printing have been supplied to, and used in offset printing, silk screen printing, and as top coat materials. In recent years, the quantity used of active energy beam-curable inks used has continued to increase, as such inks enable a simplified drying process and reduced costs, and also offer the environmental advantage of enabling a reduction in the volume of volatilized solvents.

Currently, both water-based inks and solvent-based inks are widely used as inkjet inks. These inkjet inks are used in different situations in accordance with their respective features, but their use in industrial applications faces a variety of problems, including restrictions on the printing substrate, a comparatively poor level of water resistance, a large quantity of energy required for drying the ink, and adhesion of ink components to the printing head if the ink volatilizes within the head. Accordingly, the replacement of such inks with active energy beam-curable inks, which can be used with all manner of printing substrates, exhibit favorable water resistance, require no heat energy for drying, and exhibit comparatively low levels of volatility, has been keenly anticipated.

However, although cured films formed using conventional active energy beam-curable inks are hard, they are often brittle. Furthermore, because the cured films of active energy beam-curable inks exhibit significantly inferior stretching processing properties to conventional solvent-based inks, active energy beam-curable inks tend to be unsuitable for high quality printing applications that require forming processing.

The following types of inks have been proposed in order to address the types of problems described above. Japanese Patent Laid-Open No. H05-214280 discloses an ink comprising a colorant and from 50 to 95% by weight of polymerizable monomers, wherein the ink comprises a maximum of 70% by weight of monofunctional monomers, a maximum of 70% by weight of bifunctional monomers, and from 0 to 10% by weight of trifunctional or higher monomers.

Japanese translation of PCT international application No. 2004-514014 discloses an ink composition comprising a heterocyclic radiation curable monomer and/or an alkoxylated monomer that comprise pendant alkoxylated functionality.

In order to alleviate shrinkage upon curing, Japanese translation of PCT international application No. 2004-518787 discloses an ink composition comprising an oligomer that is a reaction product of an aliphatic polyisocyanate and a radiation curable alcohol that comprises one or more radiation curable moieties, one or more hydroxyl moieties and one or more polycaprolactone ester moieties, and a reactive diluent.

Japanese Patent Laid-Open No. H06-184484 discloses an ink composition comprising a polycaprolactone-based urethane acrylate oligomer, a vinylcaprolactam and a phenoxy acrylate.

DISCLOSURE OF INVENTION

An object of the present invention is to provide an active energy beam-curable ink for inkjet printing that exhibits excellent adhesion to plastic substrates that require favorable bending and stretching processing properties, and also exhibits excellent workability and superior abrasion resistance and rub resistance. Furthermore, another object of the present invention is to provide a cured film that exhibits excellent adhesion to plastic substrates that require favorable bending and stretching processing properties, and also exhibits excellent workability and superior abrasion resistance and rub resistance. Moreover, another object of the present invention is to provide a printed item that comprises a cured film with these types of properties.

The present invention relates to an active energy beam-curable ink for inkjet printing comprising polymerizable monomers, wherein relative to the total of all the polymerizable monomers, the polymerizable monomers comprise from 95 to 99.99% by weight of a monofunctional monomer and from 0.01 to 5% by weight of a polyfunctional monomer, and a cured film of thickness 10 μm formed using the active energy beam-curable ink exhibits a drawing ability exceeding 120% when stretched at a temperature of 170° C. at a strain rate of 2/min.

Furthermore, another aspect of the present invention relates to an active energy beam-curable ink for inkjet printing comprising polymerizable monomers, wherein relative to the total of all the polymerizable monomers, the polymerizable monomers comprise from 95 to 99.99% by weight of a monofunctional monomer and from 0.01 to 5% by weight of a polyfunctional monomer, and a cured film of thickness 10 μm formed using the active energy beam-curable ink exhibits a storage elastic modulus (E') within a range from $1 \times 10^4$ to $5 \times 10^7$ Pa at an oscillation frequency of 1 Hz and a temperature within a range from 100 to 150° C.

In the invention described above, the Martens hardness of the cured film of thickness 10 μm is preferably not less than 160 N/mm².

Furthermore, in the invention described above, the glass transition point of the cured film of thickness 10 μm is preferably not less than 25° C.

In the above invention, relative to the total of all the polymerizable monomers, the polymerizable monomers preferably comprise from 50 to 100% by weight of monomers having a cyclic structure. Furthermore, relative to the total of all the polymerizable monomers, the polymerizable monomers preferably comprise from 30 to 99.99% by weight of monomers selected from the group consisting of 2-phenoxyethyl acrylate, ethylene oxide adduct monomers of 2-phenoxyethyl acrylate, and propylene oxide adduct monomers of 2-phenoxyethyl acrylate. Furthermore, relative to the total of all the polymerizable monomers, the polymerizable monomers preferably comprise from 1 to 30% by weight of 2-hydroxy-3-phenoxypropyl acrylate.

Furthermore, in the invention described above, the molecular weight of the polyfunctional monomer is preferably less than 2,000, and moreover, the polyfunctional monomer is preferably a bifunctional monomer.

In the above invention, the active energy beam-curable ink may further comprise a pigment.

Ultraviolet radiation can be used as the active energy beam for curing the active energy beam-curable ink.

Moreover, another aspect of the present invention relates to an ink set comprising at least four of the above active energy beam-curable inks, wherein the pigments contained within each of the active energy beam-curable inks are mutually different. Examples of these four active energy beam-curable inks include, for example, yellow, magenta, cyan and black inks.

Furthermore, another aspect of the present invention relates to a cured film formed using the active energy beam-curable ink described above.

Moreover, yet another aspect of the present invention relates to a printed item comprising a printing substrate and the above cured film.

This Application is related to the subject matter disclosed in prior Japanese Applications No. 2005-214433 filed on Jul. 25, 2005, No. 2005-327135 filed on Nov. 11, 2005, No. 2006-117696 filed on Apr. 21, 2006, and No. 2006-125751 filed on Apr. 28, 2006; the entire contents of which are incorporated by reference herein.

BEST MODE FOR CARRYING OUT THE INVENTION

In order to ensure that the cured film obtained by inkjet discharge of the active energy beam-curable ink (hereafter also referred to as simply "the ink") onto any of a variety of substrates and subsequent curing exhibits favorable adhesion to the substrate, high levels of abrasion resistance and rub resistance, favorable stretch properties and flexibility during forming processing such as stretching processing, and favorable adhesion following the completion of such forming processing, raising the quantity of monofunctional monomers and reducing the quantity of polyfunctional monomers within the ink are of importance. Moreover, ensuring favorable control of the drawing ability at 170° C. of the cured film formed using the ink, or favorable control of the storage elastic modulus (E') within a temperature range from 100 to 150° C. are also important.

The active energy beam-curable ink of the present invention comprises polymerizable monomers. These polymerizable monomers include a monofunctional monomer and a polyfunctional monomer. Relative to the total of all the polymerizable monomers, the quantity of the monofunctional monomer is within a range from 95 to 99.99% by weight, and is preferably from 95 to 99.9% by weight, and even more preferably from 95 to 99% by weight. The quantity of the polyfunctional monomer is within a range from 0.01 to 5% by weight, preferably from 0.1 to 5% by weight, and even more preferably from 1 to 5% by weight. As a result, the cured film formed using the active energy beam-curable ink of the present invention exhibits favorable stretch properties, flexibility, abrasion resistance, rub resistance, and adhesion.

If an ink comprises less than 95% by weight of the monofunctional monomer and more than 5% by weight of the polyfunctional monomer, then the shrinkage upon curing is large, and the adhesion of the cured film tends to deteriorate. Furthermore, in some cases, large quantities of residual stress may develop within the cured film, causing wrinkles and cracks.

One method of resolving the problem of wrinkles and cracks involves dramatically lowering the Tg value for the cured film to alleviate the stress. However, although this method resolves the problems of wrinkles and cracks, it can cause a reduction in the hardness of the cured film, leading to deterioration in the abrasion resistance and rub resistance. Accordingly, the Tg value of the cured film is preferably not reduced dramatically.

With the active energy beam-curable ink of the present invention, a cured film of thickness 10 μm formed using the ink exhibits a drawing ability exceeding 120% when stretched at a strain rate of 2/min under an atmosphere at 170° C.

The drawing ability is measured by forming a cured film of thickness 10 μm on top of a polycarbonate film substrate, and then stretching both the polycarbonate film substrate and the cured film together. The drawing ability can be measured using a universal tester such as the Tensilon (UCT-1T, manufactured by Orientec Co., Ltd.).

The drawing ability is preferably greater than 120% and not more than 300%, even more preferably not less than 150% and not more than 250%, and is most preferably not less than 170% and not more than 200%. If the drawing ability is less than 120%, then favorable stretch properties and flexibility cannot be obtained during forming processing such as stretching processing. Furthermore, if the drawing ability exceeds 300%, then the superior toughness of the cured film is lost, and practical application as a cured film becomes difficult.

By ensuring that the proportions of polymerizable monomers contained within the ink fall within the ranges described above, the drawing ability of the cured film can be increased beyond 120%.

Furthermore, with the active energy beam-curable ink of the present invention, measurement of the viscoelasticity of a cured film of thickness 10 μm formed using the ink at an oscillation frequency of 1 Hz yields a storage elastic modulus (E') for the cured film within a range from $1 \times 10^4$ to $5 \times 10^7$ Pa for the temperature range from 100 to 150° C.

E' represents the storage elastic modulus determined by measurement of the dynamic viscoelasticity. The value of E' can be measured, for example, using a viscoelasticity spectrometer EXSTAR6100DMS manufactured by Seiko Instruments Inc. Measurement can also be conducted using a typical "Vibron" viscoelasticity measurement device, in which a direct vibration is imparted to the cured film, and the resulting stress response is measured.

An ink of the present invention, which requires superior stretching processing properties, is designed so that the value of E' is within a range from $1 \times 10^4$ to $5 \times 10^7$ Pa. This value for E' is preferably within a range from $1 \times 10^5$ to $5 \times 10^7$ Pa, and even more preferably from $1 \times 10^6$ to $4 \times 10^7$ Pa.

A cured film with a storage elastic modulus that is less than the above range is able to achieve satisfactory stretching processing properties, but the stability of the cured film at high temperatures deteriorates, and irregularities may develop in the film surface following heating. Furthermore, a reduction in the gloss of the stretched cured film is also observed, which makes practical use of the film difficult.

The Martens hardness of a cured film of thickness 10 μm formed using the active energy beam-curable ink of the present invention is preferably not less than 160 N/mm$^2$.

In the present invention, the Martens hardness has been used to indicate the hardness. When evaluating the hardness of a cured film, evaluating only the materials of the cured film is usually impossible, and the hardness value is usually affected by factors such as the substrate material to which the ink has been applied, the adhesion between that substrate and the cured film, and the film thickness of the cured film. The Martens hardness, which is measured by pressing an indenter fractionally into the surface of the cured film, and then calculating the hardness based on the resulting depth and the load employed, is used within the recent DIN standards (Deutsches Institut fur Normung e.V.) as a technique that, compared with other techniques, is capable of measuring the hardness of the actual cured film itself. A microhardness tester can be used for measurement of the Martens hardness. However, there are no particular restrictions on the device used for measuring the Martens hardness, and measurement may also be conducted using a measurement device commonly known as a "nanoindenter", or any other suitable device.

The Martens hardness is even more preferably not less than 160 N/mm² and not more than 1,000 N/mm², and is most preferably not less than 200 N/mm² and not more than 800 N/mm². If this value is less than 160 N/mm², then the cured film lacks superior toughness, and may be unsuitable for certain applications, whereas if the value exceeds 1,000 N/mm², then the cured film becomes overly hard, and stretching processing may become impossible.

The glass transition point of a cured film of thickness 10 μm formed using the active energy beam-curable ink of the present invention is preferably not less than 25° C. The glass transition point (or glass transition temperature) indicates the peak temperature for the value of Tan δ determined from the above dynamic viscoelasticity measurement.

The glass transition point is even more preferably not less than 25° C. and not more than 150° C. If this value is less than 25° C., then the surface of the cured film tends to retain tack at room temperature, whereas if the value exceeds 150° C., then stretching processing tends to become difficult.

In the present invention, the polymerizable monomers refer to polymerizable monomers that function as active energy beam-curable reaction components. Specifically, the polymerizable monomers are molecules containing ethylenic unsaturated double bonds. These active energy beam-curable reaction components exclude components such as the initiators, pigments and additives described below.

In the present invention, ensuring that the polymerizable monomers include from 50 to 100% by weight of monomers having a cyclic structure enables a more favorable cured film to be formed. This proportion is preferably from 60 to 100% by weight, and even more preferably from 90 to 100% by weight.

Examples of monofunctional monomers having a cyclic structure include cyclohexyl acrylate, tetrahydrofurfuryl acrylate, benzyl acrylate, methylphenoxyethyl acrylate, 4-t-butylcyclohexyl acrylate, caprolactone-modified tetrahydrofurfuryl acrylate, tribromophenyl acrylate, ethoxylated tribromophenyl acrylate, 2-phenoxyethyl acrylate (or ethylene oxide and/or propylene oxide adduct monomers thereof), acryloylmorpholine, isobornyl acrylate, phenoxydiethylene glycol acrylate, vinylcaprolactam, vinylpyrrolidone, 2-hydroxy-3-phenoxypropyl acrylate and 1,4-cyclohexanedimethanol monoacrylate, although the above monomers should not be construed as being limited thereto.

Of these, examples of preferred monomers that offer particular suitability to inkjet printing include cyclohexyl acrylate, methylphenoxyethyl acrylate, 2-phenoxyethyl acrylate (or ethylene oxide and/or propylene oxide adduct monomers thereof), acryloylmorpholine, isobornyl acrylate, vinylcaprolactam, vinylpyrrolidone, 2-hydroxy-3-phenoxypropyl acrylate and 1,4-cyclohexanedimethanol monoacrylate.

Moreover, from the viewpoints of safety and performance of the cured film, the use of methylphenoxyethyl acrylate, 2-phenoxyethyl acrylate (or ethylene oxide and/or propylene oxide adduct monomers thereof), acryloylmorpholine, isobornyl acrylate, vinylcaprolactam, 2-hydroxy-3-phenoxypropyl acrylate and 1,4-cyclohexanedimethanol monoacrylate is particularly preferred.

Furthermore, examples of polyfunctional monomers having a cyclic structure include dimethyloltricyclodecane diacrylate, propoxylated bisphenol A di(meth)acrylate, ethoxylated bisphenol A di(meth)acrylate, cyclohexanedimethanol di(meth)acrylate, dimethyloldicyclopentane diacrylate, ethoxylated isocyanuric acid triacrylate, tri(2-hydroxyethyl) isocyanurate triacrylate and tri(meth)allyl isocyanurate, although the above monomers should not be construed as being limited thereto.

Of these, examples of preferred monomers that offer particular suitability to inkjet printing include dimethyloltricyclodecane diacrylate, propoxylated bisphenol A di(meth) acrylate and ethoxylated bisphenol A di(meth)acrylate.

In the present invention, the polymerizable monomers preferably comprise, relative to the total of all the polymerizable monomers, from 30 to 99.99% by weight of monomers selected from the group consisting of 2-phenoxyethyl acrylate, ethylene oxide adduct monomers of 2-phenoxyethyl acrylate, and propylene oxide adduct monomers of 2-phenoxyethyl acrylate. This proportion is even more preferably from 40 to 99.99% by weight, and is most preferably from 50 to 99.99% by weight.

Furthermore, in the present invention, the polymerizable monomers preferably comprise, relative to the total of all the polymerizable monomers, from 1 to 30% by weight of 2-hydroxy-3-phenoxypropyl acrylate. This proportion is even more preferably from 1 to 20% by weight.

If the ink contains these monomers having cyclic structures, then the adhesion improves. The reasons for this improvement are not entirely clear, but it is thought that the cyclic structure portion (namely, the surface) bonds to the substrate, increasing the van der Waals force. The monofunctional and polyfunctional monomers may each use either a single monomer, or if necessary, a combination of two or more different monomers.

Moreover, a monomer having no cyclic structure may also be used, either alone, or in combination with the monomer having a cyclic structure.

Specific examples of monofunctional monomers having no cyclic structure include 2-hydroxyethyl acrylate, 2-hydroxypropyl acrylate, 4-hydroxybutyl acrylate, isobutyl acrylate, t-butyl acrylate, isooctyl acrylate, 2-methoxyethyl acrylate, methoxytriethylene glycol acrylate, 2-ethoxyethyl acrylate, 3-methoxybutyl acrylate, ethoxyethyl acrylate, butoxyethyl acrylate, ethoxydiethylene glycol acrylate, methoxydipropylene glycol acrylate, dipropylene glycol acrylate, β-carboxyethyl acrylate, ethyl diglycol acrylate, trimethylolpropane formal monoacrylate, imide acrylate, isoamyl acrylate, ethoxylated succinic acid acrylate, trifluoroethyl acrylate, ω-carboxypolycaprolactone monoacrylate and N-vinylformamide, although the above monomers should not be construed as being limited thereto.

Furthermore, specific examples of polyfunctional monomers having no cyclic structure include ethylene glycol di(meth)acrylate, diethylene glycol di(meth)acrylate, polyethylene glycol di(meth)acrylate, 1,6-hexanediol di(meth) acrylate, ethoxylated 1,6-hexanediol diacrylate, neopentyl glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, hydroxypivalic acid neopentyl glycol diacrylate, 1,3-butylene glycol di(meth)acrylate, trimethylolpropane triacrylate, hydroxypivalic acid trimethylolpropane triacrylate, ethoxylated phosphoric acid triacrylate, ethoxylated tripropylene glycol diacrylate, neopentyl glycol-modified trimethylolpropane diacrylate, stearic acid-modified pentaerythritol diacrylate, pentaerythritol triacrylate, tetramethylolpropane triacrylate, tetramethylolmethane triacrylate, pentaerythritol tetraacrylate, caprolactone-modified trimethylolpropane triacrylate, propoxylated glyceryl triacrylate, tetramethylolmethane tetraacrylate, pentaerythritol tetraacrylate, ditrimethylolpropane tetraacrylate, ethoxylated pentaerythritol tetraacrylate, dipentaerythritol hexaacrylate, caprolactone-modified dipentaerythritol hexaacrylate, dipentaerythritol hydroxypentaacrylate, neopentyl glycol oligoacrylate, 1,4-butanediol oligoacrylate, 1,6-hexanediol oligoacrylate, trimethylolpropane oligoacrylate, pentaerythritol oligoacrylate, ethoxylated neopentyl glycol di(meth)acrylate, propoxylated neopentyl glycol di(meth)acrylate, tripropylene glycol di(meth)acrylate, ethoxylated trimethylolpropane triacrylate and propoxylated trimethylolpropane triacrylate, although the above monomers should not be construed as being limited thereto. These monofunctional and polyfunctional monomers may each use either a single monomer, or if necessary, a combination of two or more different monomers.

Furthermore, regardless of the existence of an aforementioned cyclic structure, if improved stretching processing properties are required, then the use of a bifunctional monomer as the polyfunctional monomer is preferred. The use of only a bifunctional monomer as the polyfunctional monomer is particularly desirable.

Furthermore, in order to enable an ink of the present invention to be prepared as a low viscosity ink, and ensure favorable long-term stability of the printed image, these polyfunctional monomers preferably comprise monomers with a molecular weight of less than 2,000. The use of a polyfunctional monomer that contains no monomers with a molecular weight of 2,000 or more, that is, a polyfunctional monomer that comprises solely monomers with a molecular weight of less than 2,000, is particularly desirable.

The active energy beam of the present invention refers to an energy beam that influences the electron orbits within the irradiated item, and generates radicals, cations or anions or the like that act as the trigger for a polymerization reaction. Examples of this active energy beam include an electron beam, ultraviolet radiation and infrared radiation, although there are no particular restrictions, provided the energy beam is capable of inducing the polymerization reaction.

The ink of the present invention refers to a liquid that is printed or coated onto a substrate surface.

In those cases where the ink of the present invention contains no coloring components, the ink can be used in coating applications. Both single coating, and layered coating that is performed together with an ink that comprises a coloring component can be conducted. In the case of layered coating, either an ink of the present invention or a conventional colored ink may be used as the ink that comprises a coloring component.

Furthermore, in order to raise the hardness of the cured film, and impart the film with superior durability such as abrasion resistance, superior forming properties, or superior design features such as a controlled level of luster, various fillers or resin components may also be added to the ink. Examples of suitable fillers include extender pigments such as calcium carbonate, barium sulfate, spherical silica, and hollow silica, and resin beads and the like. There are no particular restrictions on the resin components, provided the resin is inactive upon radiation with the active energy beam. Examples of suitable resins include polyurethane resins, vinyl chloride-based resins (such as polyvinyl chloride resins, vinyl chloride-vinyl acetate copolymers and ethylene-vinyl acetate copolymers), polyester resins, poly(meth)acrylate resins, polyketone resins, polyvinyl-based resins (such as polyvinylacetal resins, polyvinylbutyral resins and polyvinylpyrrolidone resins), and cellulose-based resins (such as CAB resins and CAP resins). In those cases where these types of fillers or resin components are added, the types of material added and the blend quantities are preferably determined with due consideration of the resulting inkjet suitability.

Furthermore, other printing methods such as silk screen printing, gravure printing or offset printing, or other coating methods such as spray coat methods or methods in which a separately formed coating layer (such as a film) is transferred by lamination may also be used. These printing methods are particularly preferred in those cases where the ink comprises a filler or resin component.

On the other hand, in those cases where the ink of the present invention comprises a coloring component, the ink can be used as a material for displaying graphics, lettering or photographs or the like. Conventionally, dyes or pigments are the most widely used coloring components, and for reasons of weather resistance, pigments are the more widely used. Of the various possible pigment components, specific examples of carbon blacks include Special Black 350, 250, 100, 550, 5, 4, 4A and 6, and Printex U, V, 140U, 140V, 95, 90, 85, 80, 75, 55, 45, 40, P, 60, L6, L, 300, 30, 3, 35, 25, A and G, all manufactured by Degussa AG, Regal 400R, 660R, 330R and 250R, and Mogul E and L, all manufactured by Cabot Corporation, and MA7, 8, 11, 77, 100, 100R, 100S, 220 and 230, and #2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95 and #260, all manufactured by Mitsubishi Chemical Corporation. Furthermore, in the present invention, yellow, magenta or cyan inks, or inks of other colors such as white can employ the types of pigments used in inks for conventional printing and coating applications. If necessary, the pigments may also be selected on the basis of their coloring properties or light resistance or the like.

A coating material used in typical printing applications such as silk screen printing, gravure printing or offset printing may also be layered on top of the ink layer comprising a coloring component of the present invention. Furthermore, the ink layer comprising a coloring component of the present invention may be coated with a separately formed coating layer (such as a film) using a lamination transfer, or coated with a spray coating material.

The proportion of the pigment relative to the total weight of the ink, is preferably within a range from 0.2 to 15 parts by weight of the yellow, magenta, cyan or black organic pigment per 100 parts by weight of the ink. In the case of white titanium oxide, the proportion is preferably within a range from 5 to 40 parts by weight per 100 parts by weight of the ink.

Furthermore, the ink of the present invention may also use a dispersant to disperse and stabilize the filler and pigment.

A multitude of dispersants exist, including polymer dispersants and low molecular weight dispersants, and these can be selected in accordance with the dispersibility required. Pigment derivatives can also be used as dispersion assistants.

Furthermore, in those cases where ultraviolet radiation is used as the active energy beam, the ink usually contains a photopolymerization initiator. This photopolymerization initiator can be selected freely in accordance with the curing rate, the properties of the cured film and the coloring component. Specifically, molecular cleavage initiators or hydrogen abstraction initiators are particularly suitable as the photoradical polymerization initiator in the present invention. Specific examples include benzoin isobutyl ether, 2,4-diethylthioxanthone, 2-isopropylthioxanthone, benzil, 2,4,6-trimethylbenzoyldiphenylphosphine oxide, 2-benzyl-2-dimethylamino-1-(4-morpholinophenyl)-butan-1-one, bis(2, 4,6-dimethoxybenzoyl)-2,4,4-trimethylpentylphosphine oxide, 1,2-octanedione and 1-(4-(phenylthio)-2,2-(o-benzoyloxime)). Examples of other molecular cleavage initiators that may be used in combination with the above initiators include 1-hydroxycyclohexyl phenyl ketone, benzoin ethyl ether, benzyl dimethyl ketal, 2-hydroxy-2-methyl-1-phenyl-propan-1-one, 1-(4-isopropylphenyl)-2-hydroxy-2-methylpropan-1-one and 2-methyl-1-(4-methylthiophenyl)-2-morpholinopropan-1-one. Moreover, hydrogen abstraction photopolymerization initiators such as benzophenone, 4-phenylbenzophenone, isophthalphenone and 4-benzoyl-4'-methyl-diphenylsulfide may also be used in combination with the above initiators.

The quantity of the photopolymerization initiator is preferably within a range from 5 to 20% by weight of the ink.

With the above photoradical polymerization initiator, an amine that does not undergo an addition reaction with the above polymerizable monomers may also be added as a sensitizer, and suitable examples of this amine include trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone. The photoradical polymerization initiator and the sensitizer described above are, of course, preferably selected from those materials that exhibit excellent solubility within the polymerizable monomers, and do not inhibit the transmittance of ultraviolet light.

The quantity of the sensitizer is preferably within a range from 0 to 5% by weight of the ink.

Furthermore, in those cases where an electron beam is used as the active energy beam, the active energy beam-curable ink can be prepared as an electron beam-curable ink by excluding the above initiator and sensitizer.

In the present invention, a polymerization inhibitor such as hydroquinone, p-methoxyphenol, t-butylcatechol, pyrogallol or butylhydroxytoluene is preferably added to the ink in a quantity within a range from 0.01 to 5% by weight in order to enhance the stability of the ink over time, and improve the stability of the ink within an inkjet discharge apparatus.

Furthermore, additives for imparting all manner of functions may also be added to the ink. Examples of these additives include one or more conventionally used plasticizers, wetting modifiers, surface tension modifiers, antifoaming agents, slipping agents, anti-blocking agents, ultraviolet light inhibitors, photostabilizers and antioxidants such as dibutylhydroxytoluene, one or more of which may be added according to need. The dispersants, dispersion assistants and additives can be selected in accordance with the intended application, and no particular restrictions are specified within the present invention.

The ink of the present invention can be used within a set comprising a plurality of inks containing different pigments, such as a set comprising 4, 5, 6 or 7 different inks. Examples of sets containing four inks include ink sets comprising yellow, magenta, cyan and black inks, and ink sets comprising yellow, magenta, cyan and white inks.

The ink of the present invention is printed onto a printing substrate using an inkjet discharge apparatus. There are no particular restrictions on the printing substrates that can be used with the present invention, and suitable substrates include polycarbonate, rigid vinyl chloride, flexible vinyl chloride, polystyrene, polystyrene foam, polymethyl methacrylate (PMMA), polypropylene, polyethylene, polyethylene terephthalate (PET), plastic substrates comprising mixtures or modified products of the above substrates, glass, metal substrates such as stainless steel, and timber.

The ink that has been inkjet-discharged onto the printing substrate is converted to a cured film by irradiation with an active energy beam. There are no particular restrictions on the thickness of the cured film formed on the printing substrate using the ink of the present invention, and a suitable thickness can be selected in accordance with the intended application.

The film thickness is preferably within a range from 4 to 50 µm, even more preferably from 5 to 50 µm, and is most preferably from 7 to 40 µm.

A cured film used for evaluating the ink properties can be prepared, for example, using the following method. First, the ink of the present invention is printed solidly onto a substrate with favorable releasability such as polyethylene, using an inkjet discharge apparatus. Subsequently, the solid-printed ink is subjected to ultraviolet light irradiation using an ultraviolet irradiation apparatus (120 W/cm, one high-pressure mercury lamp, conveyor speed: 5 m/min., 1 pass), thus forming a cured film of thickness 10 µm. This cured film may be cut to size if necessary.

The ratio of monofunctional/polyfunctional monomers is controlled in the ink of the present invention. Moreover, in order to achieve both favorable strength and stretching processing properties for the resulting cured film, the drawing ability or storage elastic modulus (E') of the cured film of the ink of the present invention is also controlled. Moreover, in the ink of the present invention, if required, the monomer structure may be specified, the composition of monomers having a specified structure may be controlled, and the Tg value of the cured film may be controlled. As a result, an active energy beam-curable ink can be provided that exhibits excellent adhesion to substrates, and particularly to polycarbonates, exhibits superior bending and stretching properties, as well as superior levels of abrasion resistance and rub resistance. Moreover, suitable monomers can be selected and used within the ink of the present invention. As a result, the viscosity of the ink can be kept low, and erosion of the head member by the ink can be prevented. Furthermore, low molecular weight polyfunctional monomers can be selected and used within the ink of the present invention. As a result, the generation of satellite droplets, which tend to occur during ink discharge, can be suppressed, enabling attractive printed items to be printed for long periods.

EXAMPLES

As follows is a description of specifics of the present invention, based on a series of examples, although the present invention is in no way limited by these examples. In the examples, "parts" refers to "parts by weight".

First, a pigment dispersion A was prepared with the formulation shown below. The dispersion A was prepared by adding the pigment and the dispersant to the monomer, conducting mixing with a high-speed mixer or the like until a uniform mixture was obtained, and then dispersing the thus obtained mill base in a horizontal sand mill for approximately one hour.

Lionol Blue FG-7400G (a phthalocyanine pigment, manufactured by Toyo Ink Mfg. Co., Ltd.): 30 parts Solsperse 32000 (a pigment dispersant, manufactured by The Lubrizol Corporation): 9 parts Phenoxyethyl acrylate: 61 parts Furthermore, a pigment dispersion B was prepared with the formulation shown below. The dispersion was prepared using the same production method as that employed for the dispersion A.

Novoperm Yellow P-HG (a benzimidazolone pigment, manufactured by Clariant Ltd.): 35 parts Solsperse 24000 (a pigment dispersant, manufactured by The Lubrizol Corporation): 7 parts Phenoxyethyl acrylate: 58 parts Furthermore, a pigment dispersion C was prepared with the formulation shown below. The dispersion was prepared using the same production method as that employed for the dispersion A.

Hostaperm Red E5B02 (a quinacridone pigment, manufactured by Clariant Ltd.): 20 parts
Solsperse 24000 (a pigment dispersant, manufactured by The Lubrizol Corporation): 6 parts
Phenoxyethyl acrylate: 74 parts Furthermore, a pigment dispersion D was prepared with the formulation shown below. The dispersion was prepared using the same production method as that employed for the dispersion A.

Special Black 350 (a carbon black pigment, manufactured by Degussa AG): 30 parts
Solsperse 32000 (a pigment dispersant, manufactured by The Lubrizol Corporation): 6 parts
Phenoxyethyl acrylate: 64 parts Furthermore, a pigment dispersion E was prepared with the formulation shown below. The dispersion was prepared using the same production method as that employed for the dispersion A.

Tipaque PF740 (a white pigment, silica treatment: 1.0%, alumina treatment 2.0%, manufactured by Ishihara Sangyo Kaisha, Ltd.): 40 parts
Ajisper PB821 (a pigment dispersant, manufactured by Ajinomoto-Fine-Techno Co., Inc.): 2 parts
Phenoxyethyl acrylate: 58 parts

Example 1

The raw materials shown in Table 1 were mixed together in sequence, starting with the material in the top block of the table. Following mixing for two hours, all the raw materials except for the pigment were confirmed as having dissolved, and the mixture was then filtered through a membrane filter, thereby removing coarse particles and completing preparation of the ink. Coarse particles can cause head blockages. Using an ink discharge apparatus, the ink was discharged onto a polycarbonate substrate (Panlite, manufactured by Teijin Ltd., thickness: 1 mm) in sufficient quantity to generate a film thickness of 10 μm. Following discharge, the ink was cured by ultraviolet irradiation using an ultraviolet irradiation apparatus manufactured by Harrison Toshiba Lighting Co., Ltd. (120 W/cm, one high-pressure mercury lamp, conveyor speed: 5 m/min., 1 pass), thus forming a cured film (film thickness: 10 μm). Furthermore, in order to measure the physical properties of the lone cured film, a cured film (film thickness: 10 μm) was also prepared under the same conditions as above, by discharging the ink onto a polyethylene substrate and then curing the ink. After standing for 24 hours, the cured film was peeled gently away from the polyethylene substrate.

Example 2 to Example 5

Using the same method as the example 1, inks were prepared using the formulations shown in Table 1, and the inks were then printed and cured to form cured films.

Comparative Examples 1 to 4

Using the same method as the example 1, inks were prepared using the formulations shown in Table 1, and the inks were then printed and cured to form cured films.

Evaluation Methods (Drawing Ability)

The cured film on the polycarbonate substrate was punched out into a dumbbell shape, together with the substrate, using a punching cutter (manufactured by Dumbbell Co., Ltd.), thus forming a test piece (15×120 mm). The thus obtained test piece was heated to 170° C. and then subjected to a tensile test, with the substrate still attached, using a Tensilon (UCT-1T, manufactured by Orientec Co., Ltd.). Because ascertaining the fracture point of the cured film based on the tension variation obtained from the load cell was difficult, the fracture point was taken as being the point where the surface of the cured film was visually confirmed to have fractured.

(Hardness)

The hardness of the prepared cured film on the polycarbonate substrate was measured using a Fischerscope H100C hardness meter (manufactured by Fischer Instruments Co., Ltd.). The measurement was conducted using a Vickers indenter (a square-based pyramid made of diamond with an apex angle of 136°), and was performed in a 25° C. temperature-controlled chamber using a indentation depth of 1 μm and a indentation time of 30 seconds. The values obtained by repeating the same measurement at 10 random locations across the same cured film surface were averaged, and the Martens hardness value was then determined.

(Storage Elastic Modulus, Glass Transition Temperature)

The prepared cured film on the polyethylene substrate was left to stand for 24 hours and was then cut precisely to a width of 5 mm and a length of 30 mm, and the cured film was then peeled gently away from the substrate and measured using a DMS6100 apparatus (manufactured by Seiko Instruments Inc.) The measurement conditions included a measurement vibrational amplitude of 1 Hz, a heating rate of 2° C./min., and a temperature range from −30 to 180° C. The peak top temperature for Tan δ was determined from the resulting profile and used as the glass transition temperature. Furthermore, the value of E' for the range from 100 to 150° C. was read off the profile.

(Adhesion)

The cured film on the polycarbonate substrate was cross-cut at 1 mm intervals to form a grid of 100 squares, and a cellophane tape was stuck to the squares. Following rubbing of the surface of the cellophane tape with an eraser to ensure that the cellophane tape had bonded satisfactorily to the cured film, the cellophane tape was peeled off at an angle of 90°. The adhesion was evaluated on the basis of the degree of adhesion of the cured film to the substrate. The evaluation criteria were as shown below.

A: absolutely no peeling of the 100 squares was observed
B: although all 100 squares remained attached, some damage to the edges of the squares was visible
C: from 1 to 49 of the 100 squares were peeled off
D: from 50 to 99 of the 100 squares were peeled off
E: all 100 squares were peeled off In the examples 1 to 5, because the proportion of the monofunctional monomer was not less than 95% and the drawing ability exceeded 120%, or because the proportion of the monofunctional monomer was not less than 95% and the value of E' was controlled within a range from $1\times10^4$ to $5\times10^7$ Pa, inks with superior adhesion, workability, abrasion resistance and rub resistance were able to be obtained. Furthermore, as a result of controlling the Martens hardness to a value of not less than 160 N/mm$^2$, inks of even greater abrasion resistance and rub resistance were obtained. In either case, because the drawing ability exceeds 120%, cured films exhibits superior process drawing ability to cured films obtained using inkjet printing, conventional silk screen or offset UV printing techniques, which represents a significant technical improvement.

Because the inks of the examples 1 to 5 contain no oligomers, they exhibit a low viscosity and superior discharge stability, and were also found to cause no corrosion of the head.

Furthermore, in the comparative examples 1 to 4, because the blend quantity of the polyfunctional monomer was high and the drawing ability was 120% or less, or because the blend quantity of the polyfunctional monomer was high and the value of E' was also designed to be high, cracking or rupture occurred not only during stretching processing that required a large degree of deformation, but also during processing such as punching or bending processes that required comparatively little deformation. In addition, the adhesion was also poor for the comparative examples 2 and 4, and the hardness value was low for the comparative examples 3 and 4, meaning the abrasion resistance and rub resistance were inferior, and none of them was suitable for use within actual production processes.

Furthermore, when the inks of the examples 1 to 4 were combined as a set, and process printing (yellow, magenta, cyan, black) was conducted, the drawing ability was 100%. Furthermore, the value for the Martens hardness was 195 N/mm$^2$. The drawing ability, abrasion resistance and rub resistance and the like all exhibited satisfactory performance.

Furthermore, if even one ink in the ink set comprising the inks of the examples 1 to 4 was replaced with an ink from one of the comparative examples 1 to 4, and process printing was then conducted, the drawing ability did not reach 70%. Only those cases where all of the colored inks used within the ink set exhibited satisfactory drawing ability resulted in an adequate level of drawing ability for the ink set, and such ink sets exhibited superior stretching processing properties.

Furthermore, printed items obtained by conducting printing using the inks described in the examples 1 to 5 were subjected to layer coating using the ink of either reference example 1 or 2, which contained no coloring component. All of the resulting printed items exhibited a high degree of drawing ability exceeding 120%, and displayed excellent stretching processing properties.

The cured products obtained using the active energy beam-curable inks for inkjet printing according to the present invention exhibited superior workability, excellent abrasion resistance and rub resistance, and superior adhesion. As a result, the potential applications for UV printing, which has conventionally suffered from problems of workability, can be greatly expanded. The active energy beam-curable ink for inkjet printing according to the present invention is particularly suited to interior or exterior printing applications in which processing is used to enhance the attractiveness, printing to CD or DVD discs or the like, and printing to impermeable substrates centered on printing to flexible substrates.

TABLE 1

| Blend components | Monomer Cyclic structure | Example 1 Blend quantity | Example 1 Monomer ratio | Example 2 Blend quantity | Example 2 Monomer ratio | Example 3 Blend quantity | Example 3 Monomer ratio | Example 4 Blend quantity | Example 4 Monomer ratio | Example 5 Blend quantity | Example 5 Monomer ratio |
|---|---|---|---|---|---|---|---|---|---|---|---|
| Pigment dispersion | | | | | | | | | | | |
| Dispersion A (Cyan) | | 10.0 | | | | | | | | | |
| Dispersion B (Magenta) | | | | 10.0 | | | | | | | |
| Dispersion C (Yellow) | | | | | | | | | | | |
| Dispersion D (Black) | | | | | | 10.0 | | | | 10.0 | |
| Dispersion E (White) | | | | | | | | 10.0 | | | |
| Monofunctional monomer | | | | | | | | | | | |
| Phenoxyethyl acrylate | Yes | 52.5 | 60.98% | 40.5 | 48.33% | 81.8 | 91.49% | 88.7 | 98.64% | 88.9 | 98.86% |
| Acryloylmorpholine | Yes | | | | | | | | | | |
| Vinylcaprolactam | Yes | 15.0 | 15.61% | 15.0 | 15.66% | | | | | | |
| Isobornyl acrylate | Yes | 10.0 | 10.41% | 20.0 | 20.88% | 5.0 | 5.19% | | | | |
| Kayarad R-128H | Yes | 10.0 | 10.41% | 10.0 | 10.44% | | | | | | |
| Isooctyl acrylate | No | | | | | | | | | 1.0 | 1.04% |
| Lauryl acrylate | No | | | | | | | | | | |
| Polyfunctional monomer | | | | | | | | | | | |
| Neopentyl glycol diacrylate | No | | | | | | | | | | |
| PEG400 diacrylate | No | | | | | | | | | | |
| Kayarad R551 | Yes | 2.5 | 2.60% | 4.5 | 4.70% | 3.2 | 3.32% | 1.3 | 1.36% | 0.1 | 0.10% |
| Trimethylolpropane triacrylate | No | | | | | | | | | | |
| | | 100.0 | 100.00% | 100.0 | 100.00% | 100.0 | 100.00% | 100.0 | 100.00% | 100.0 | 100.00% |
| Initiator additive | | | | | | | | | | | |
| Irg907 | | 5 | | 5 | | 5 | | 5 | | 5 | |
| Irg819 | | 5 | | 5 | | 5 | | 5 | | 5 | |
| BHT | | 1 | | 1 | | 1 | | 1 | | 1 | |
| Solbin CL | | | | | | | | | | | |
| Polymerizable monomers blend ratio | | | Monomer ratio | | Monomer ratio | | Monomer ratio | | Monomer ratio | | Monomer ratio |
| Monofunctional monomer | | | 97.40% | | 95.30% | | 96.68% | | 98.64% | | 99.90% |
| Polyfunctional monomer | | | 2.60% | | 4.70% | | 3.32% | | 1.35% | | 0.10% |
| Cyclic monomers | | | 100.00% | | 100.00% | | 100.00% | | 100.00% | | 98.96% |

TABLE 1-continued

| | | | | | | | | | |
|---|---|---|---|---|---|---|---|---|---|
| Tg(° C.) | 44 | | 45 | | 15 | | 10 | | 8 |
| E'(Pa) | $5.3 \times 10^6$ to $9.0 \times 10^6$ | | $8.1 \times 10^6$ to $2.6 \times 10^7$ | | $8.0 \times 10^6$ to $9.8 \times 10^6$ | | $2.0 \times 10^6$ to $3.8 \times 10^6$ | | $1.0 \times 10^6$ to $3.2 \times 10^6$ |
| Drawing ability (%) | 194% | | 145% | | 170% | | 198% | | 220% |
| Adhesion | A | | A | | A | | A | | A |
| Hardness (N/mm$^2$) | 170 | | 188 | | 174 | | 168 | | 165 |

| | Ref. Ex. 1 | | Ref. Ex. 2 | | Com. Ex. 1 | | Com. Ex. 2 | | Com. Ex. 3 | |
|---|---|---|---|---|---|---|---|---|---|---|
| Blend components | Blend quantity | Monomer ratio | Blend quantity | Monomer ratio | Blend quantity | Monomer ratio | Blend quantity | Monomer ratio | Blend quantity | Monomer ratio |
| Pigment dispersion | | | | | | | | | | |
| Dispersion A (Cyan) | | | | | 10.0 | | | | | |
| Dispersion B (Magenta) | | | | | | | 10.0 | | | |
| Dispersion C (Yellow) | | | | | | | | | 10.0 | |
| Dispersion D (Black) | | | | | | | | | | |
| Dispersion E (White) | | | | | | | | | | |
| Monofunctional monomer | | | | | | | | | | |
| Phenoxyethyl acrylate | 95.8 | 95.80% | 97.5 | 97.50% | 30.0 | 37.57% | 10.0 | 16.49% | 65.0 | 74.33% |
| Acryloylmorpholine | | | | | | | 10.0 | 10.44% | | |
| Vinylcaprolactam | | | | | 12.0 | 12.49% | | | | |
| Isobornyl acrylate | | | | | 20.0 | 20.88% | 10.0 | 10.44% | | |
| Kayarad R-128H | | | | | | | | | | |
| Isooctyl acrylate | | | | | | | 10.0 | 10.44% | | |
| Lauryl acrylate | 1.0 | 1.00% | | | | | | | | |
| Polyfunctional monomer | | | | | | | | | | |
| Neopentyl glycol diacrylate | | | | | | | | | 25.0 | 25.67% |
| PEG400 diacrylate | | | | | | | 30.0 | 31.32% | | |
| Kayarad R551 | 3.2 | 3.20% | 2.5 | 2.50% | 28.0 | 29.14% | | | | |
| Trimethylolpropane triacrylate | | | | | | | 20 | 20.88% | | |
| | 100.0 | 100.00% | 100.0 | 100.00% | 100.0 | 100.00% | 100.0 | 100.00% | 100.0 | 100.00% |
| Initiator additive | | | | | | | | | | |
| Irg907 | 5 | | 5 | | 5 | | 5 | | | |
| Irg819 | 5 | | 5 | | 5 | | 5 | | | |
| BHT | 1 | | 1 | | 1 | | 1 | | | |
| Solbin CL | | | 3 | | | | | | | |
| Polymerizable monomers blend ratio | | Monomer ratio | | Monomer ratio | | Monomer ratio | | Monomer ratio | | Monomer ratio |
| Monofunctional monomer | | 96.80% | | 97.50% | | 70.86% | | 47.81% | | 74.33% |
| Polyfunctional monomer | | 3.20% | | 2.50% | | 29.14% | | 52.19% | | 25.67% |
| Cyclic monomers | | 99.00% | | 100.00% | | 100.00% | | 37.37% | | 74.33% |
| Tg(° C.) | 8 | | 8 | | 43 | | 41 | | 17 | |
| E'(Pa) | $1.0 \times 10^6$ to $3.2 \times 10^6$ | | $1.0 \times 10^6$ to $3.2 \times 10^6$ | | $7.2 \times 10^8$ to $1.8 \times 10^9$ | | $6.7 \times 10^9$ to $8.9 \times 10^9$ | | $6.7 \times 10^8$ to $1.3 \times 10^9$ | |
| Drawing ability (%) | 160% | | 188% | | 31% | | 8% | | 41% | |
| Adhesion | A | | A | | B | | E | | A | |
| Hardness (N/mm$^2$) | 189 | | 171 | | 227 | | 240 | | 141 | |

| | Com. Ex. 4 | | Com. Ex. 5 | |
|---|---|---|---|---|
| Blend components | Blend quantity | Monomer ratio | Blend quantity | Monomer ratio |
| Pigment dispersion | | | | |
| Dispersion A (Cyan) | | | | |
| Dispersion B (Magenta) | | | | |
| Dispersion C (Yellow) | | | | |
| Dispersion D (Black) | 10.0 | | | |
| Dispersion E (White) | | | | |
| Monofunctional monomer | | | | |
| Phenoxyethyl acrylate | 20.0 | 27.39% | 68.0 | 68.00% |
| Acryloylmorpholine | | | | |
| Vinylcaprolactam | | | | |
| Isobornyl acrylate | | | 25.0 | 25.00% |
| Kayarad R-128H | | | | |
| Isooctyl acrylate | 30.0 | 31.12% | | |
| Lauryl acrylate | | | | |

TABLE 1-continued

| Polyfunctional monomer | | | | |
|---|---|---|---|---|
| Neopentyl glycol diacrylate | 20.0 | 20.75% | | |
| PEG400 diacrylate | 20.0 | 20.75% | | |
| Kayarad R551 | | | 7.0 | 7.00% |
| Trimethylolpropane triacrylate | | | | |
| | 100.0 | 100.00% | 100.0 | 100.00% |
| Initiator additive | | | | |
| Irg907 | 5 | | 5 | |
| Irg819 | 5 | | 5 | |
| BHT | 1 | | 1 | |
| Solbin CL | | | | |

| Polymerizable monomers blend ratio | Monomer ratio | Monomer ratio |
|---|---|---|
| Monofunctional monomer | 58.51% | 93.00% |
| Polyfunctional monomer | 41.49% | 7.00% |
| Cyclic monomers | 27.39% | 100.00% |
| Tg(° C.) | 14 | 33 |
| E'(Pa) | $4.3 \times 10^9$ to $6.0 \times 10^9$ | $9.4 \times 10^8$ to $2.3 \times 10^9$ |
| Drawing ability (%) | 19% | 120% |
| Adhesion | E | C |
| Hardness (N/mm$^2$) | 152 | 235 |

Kayarad R-128H: 2-hydroxy-3-phenoxypropyl acrylate (manufactured by Nippon Kayaku Co., Ltd.)
PEG400 diacrylate: nonaethylene glycol diacrylate (manufactured by Nippon Kayaku Co., Ltd.)
Kayarad R-551: ethoxylated or propoxylated bisphenol A diacrylate (manufactured by Nippon Kayaku Co., Ltd.)
Irg907: 2-methyl-1-[4-(methylthio)phenyl]-2-morpholinopropan-1-one (manufactured by Ciba Specialty Chemicals Inc.)
Irg819: bis(2,4,6-trimethylbenzoyl)-phenylphosphine oxide (manufactured by Ciba Specialty Chemicals Inc.)
BHT: dibutylhydroxytoluene (manufactured by Rhodia, Ltd.)
Solbin CL: modified vinyl chloride-vinyl acetate-resin (manufactured by Nissin Chemical Industry Co., Ltd.)
Blend quantities (parts)

INDUSTRIAL APPLICABILITY

According to an active energy beam-curable ink for inkjet printing of the present invention, a cured film and printed item can be obtained that exhibit excellent stretching processing properties and adhesion of the cured film, as well as superior abrasion resistance and rub resistance. The active energy beam-curable ink for inkjet printing according to the present invention can be used favorably within applications that involve conducting printing onto flexible substrates, and applications in which the substrate is subjected to deformation following inkjet printing.

The invention claimed is:

1. An active energy beam-curable ink comprising polymerizable monomers, wherein
relative to a total of all the polymerizable monomers, the polymerizable monomers comprise from 95 to 99.99% by weight of a monofunctional monomer and from 0.01 to 5% by weight of a polyfunctional monomer wherein the polyfunctional monomer includes ethoxylated or propoxylated bisphenol A diacrylate, and
a cured film of thickness 10 μm formed using the active energy beam-curable ink exhibits a drawing ability exceeding 120% when stretched at a temperature of 170° C. at a strain rate of 2/min.

2. An active energy beam-curable ink comprising polymerizable monomers, wherein
relative to the total of all the polymerizable monomers, the polymerizable monomers comprise from 95 to 99.99% by weight of a monofunctional monomer and from 0.01 to 5% by weight of a polyfunctional monomer wherein the polyfunctional monomer includes ethoxylated or propoxylated bisphenol A diacrylate, and
a cured film of thickness 10 μm formed using the active energy beam-curable ink exhibits a storage elastic modulus (E') within a range from $1 \times 10^4$ to $5 \times 10^7$ Pa at an oscillation frequency of 1 Hz and a temperature within a range from 100 to 150° C.

3. The active energy beam-curable ink according to claim 1, wherein a Martens hardness of the cured film of thickness 10 μm is not less than 160 N/mm$^2$.

4. The active energy beam-curable ink according to claim 1, wherein a glass transition point of the cured film of thickness 10 μm is not less than 25° C.

5. The active energy beam-curable ink according to claim 1, wherein relative to a total of all the polymerizable monomers, the polymerizable monomers comprise from 50 to 100% by weight of monomers having a cyclic structure.

6. The active energy beam-curable ink according to claim 1, wherein relative to a total of all the polymerizable monomers, the polymerizable monomers comprise from 30 to 99.99% by weight of a monomer selected from the group consisting of 2-phenoxyethyl acrylate, ethylene oxide adduct monomers of 2-phenoxyethyl acrylate, and propylene oxide adduct monomers of 2-phenoxyethyl acrylate.

7. The active energy beam-curable ink according to claim 1, wherein relative to a total of all the polymerizable monomers, the polymerizable monomers comprise from 1 to 30% by weight of 2-hydroxy-3-phenoxypropyl acrylate.

8. The active energy beam-curable ink according to claim 1, further comprising a pigment.

9. The active energy beam-curable ink according to claim 1, wherein the active energy beam is ultraviolet radiation.

10. The active energy beam-curable ink according to claim 1, wherein a molecular weight of the polyfunctional monomer is less than 2,000.

11. The active energy beam-curable ink according to claim 1, wherein the polyfunctional monomer is a bifunctional monomer.

12. An ink set comprising at least four active energy beam-curable inks according to claim 8, wherein the pigments contained within each of the active energy beam-curable inks are mutually different.

13. An ink set according to claim 12, wherein the four active energy beam-curable inks are yellow, magenta, cyan and black inks.

14. A cured film formed using the active energy beam-curable ink according to claim 1.

15. A printed item comprising a printing substrate and the cured film according to claim 14.

16. The active energy beam-curable ink according to claim 1, wherein 90 to 100% by weight of the polymerizable monomers have a cyclic structure.

* * * * *

UNITED STATES PATENT AND TRADEMARK OFFICE
CERTIFICATE OF CORRECTION

| | | |
|---|---|---|
| PATENT NO. | : 8,105,679 B2 | |
| APPLICATION NO. | : 11/995004 | |
| DATED | : January 31, 2012 | |
| INVENTOR(S) | : Kazuhiro Jonai et al. | |

It is certified that error appears in the above-identified patent and that said Letters Patent is hereby corrected as shown below:

On the title page, Item (54) and column 1, lines 1-2, the Title is incorrect. Item (54) and column 1, should read:

--ACTIVE ENERGY BEAM-CURABLE INK FOR INKJET PRINTING--

Signed and Sealed this
Nineteenth Day of June, 2012

David J. Kappos
*Director of the United States Patent and Trademark Office*